(12) United States Patent
Iverson et al.

(10) Patent No.: US 10,183,644 B1
(45) Date of Patent: Jan. 22, 2019

(54) PET BARRIER

(71) Applicant: MacNeil IP LLC, Bolingbrook, IL (US)

(72) Inventors: David S. Iverson, Oak Brook, IL (US); David F. MacNeil, Fort Lauderdale, FL (US); Frederick W. Masanek, Jr., Barrington, IL (US)

(73) Assignee: MacNeil IP LLC, Bolingbrook, IL (US)

(*) Notice: Subject to any disclaimer, the term of this patent is extended or adjusted under 35 U.S.C. 154(b) by 0 days.

(21) Appl. No.: 15/656,359

(22) Filed: Jul. 21, 2017

(51) Int. Cl.
*B60R 21/02* (2006.01)

(52) U.S. Cl.
CPC .................. *B60R 21/026* (2013.01)

(58) Field of Classification Search
CPC .............................. B60R 21/026; B60R 21/06
USPC ....................................................... 296/24.31
See application file for complete search history.

(56) References Cited

U.S. PATENT DOCUMENTS

| | | | |
|---|---|---|---|
| 2,219,169 A | 10/1940 | Alter | |
| 2,903,227 A | 9/1959 | Key | |
| 3,002,784 A * | 10/1961 | Bagg | B60R 13/0823 296/24.41 |
| D326,076 S * | 5/1992 | Wiese | D30/119 |
| 5,363,618 A | 11/1994 | Underwood | |
| 5,409,029 A | 4/1995 | Davis | |
| 5,824,253 A | 10/1998 | Kassardjian et al. | |
| 5,924,469 A | 7/1999 | Whittemore | |
| D433,354 S | 11/2000 | Donets | |
| 6,192,628 B1 * | 2/2001 | Pinheiro | B60J 1/20 160/105 |
| 6,796,589 B2 * | 9/2004 | Dolman | B60R 21/026 296/24.43 |
| 6,923,487 B1 * | 8/2005 | Wang | B60R 21/06 119/771 |
| 8,226,056 B2 | 7/2012 | Kallman | |
| 8,678,021 B2 | 3/2014 | Vasilatos et al. | |
| 8,746,266 B2 | 6/2014 | Palmer et al. | |
| D764,161 S | 8/2016 | Vasilatos et al. | |

(Continued)

OTHER PUBLICATIONS

MacNeil Automotive Products Limited, WeatherTech Pet Barrier, Instruction Manual, 3 pages, Mar. 2002.

(Continued)

*Primary Examiner* — Pinel E Romain
(74) *Attorney, Agent, or Firm* — Perkins IP Law Group LLC; Jefferson Perkins

(57) ABSTRACT

An improved pet barrier has first and second spaced-apart vertical poles and one or more horizontally oriented fences that are affixed to the poles. At least the top ends of the poles terminate in resilient, convexly curved feet. The feet have contact surfaces that are approximately hemitoroidal in shape. Each pole may have a tube and an elongate upright extending out of the tube and may have a coarse adjustment mechanism that permits the vertical insert to extend out of the top end of the tube by one of several preselected heights. Each pole may have a fine adjustment mechanism including a lead screw and a nut that rotates on a groove formed near the end of the pole tube. A fence clamp clamps upper and lower cross bars of the fence to the clamp using a single threaded fastener, the clamping action also affixing the fence to the pole.

22 Claims, 14 Drawing Sheets

(56) References Cited

U.S. PATENT DOCUMENTS

| | | | |
|---|---|---|---|
| 2009/0256377 A1* | 10/2009 | Beechie | B60R 21/026 296/24.46 |
| 2011/0023788 A1* | 2/2011 | Beechie | B60R 21/026 119/172 |
| 2012/0181808 A1* | 7/2012 | Reed | A01K 1/0272 296/24.31 |
| 2013/0291913 A1 | 11/2013 | Soletski et al. | |
| 2015/0232052 A1* | 8/2015 | Link | B60R 21/026 296/24.31 |

OTHER PUBLICATIONS

MacNeil Automotive Products Limited, WeatherTech Pet Barrier, Extension Instruction Manual, 3 pages, Mar. 2002.

\* cited by examiner

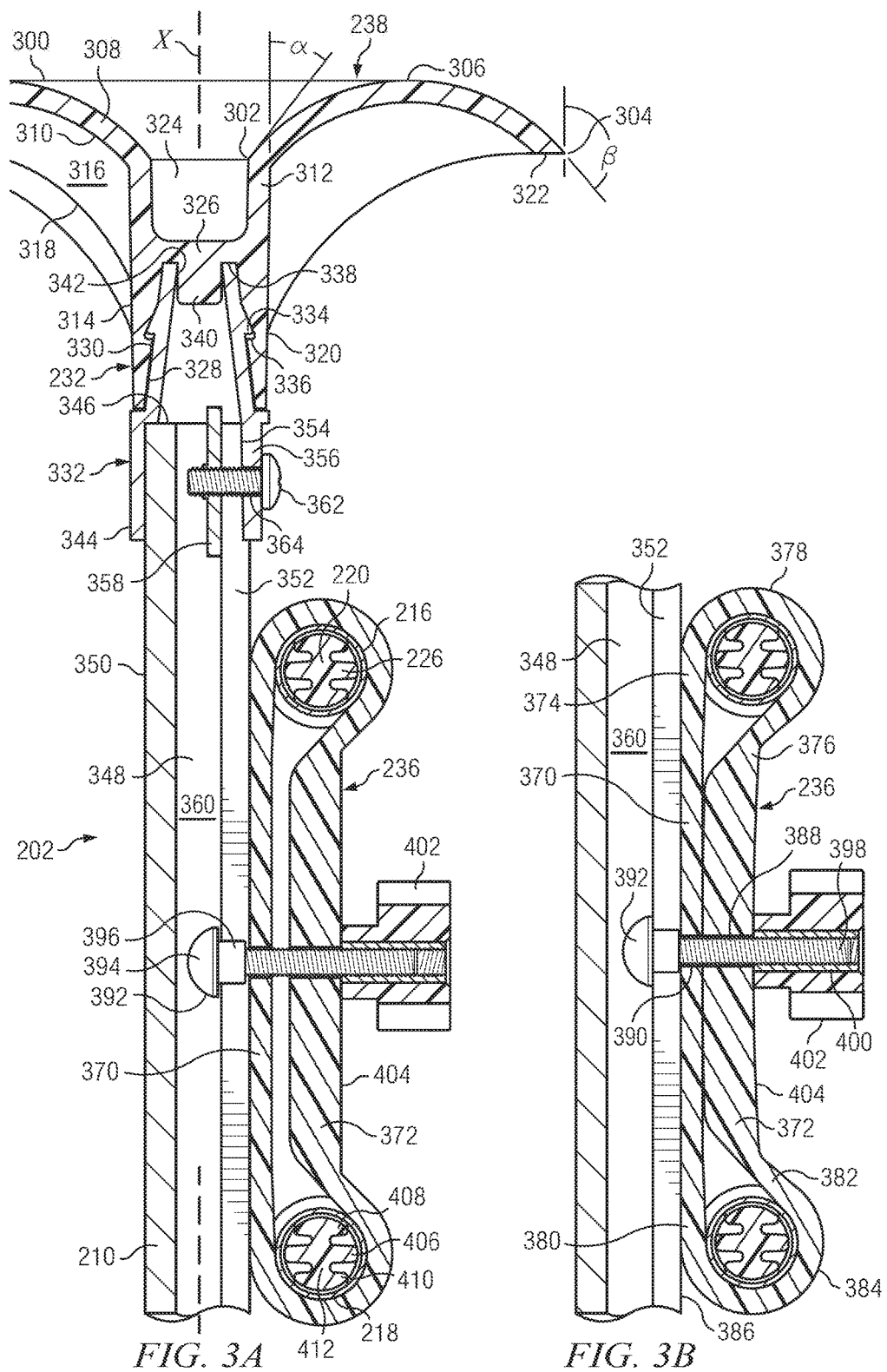

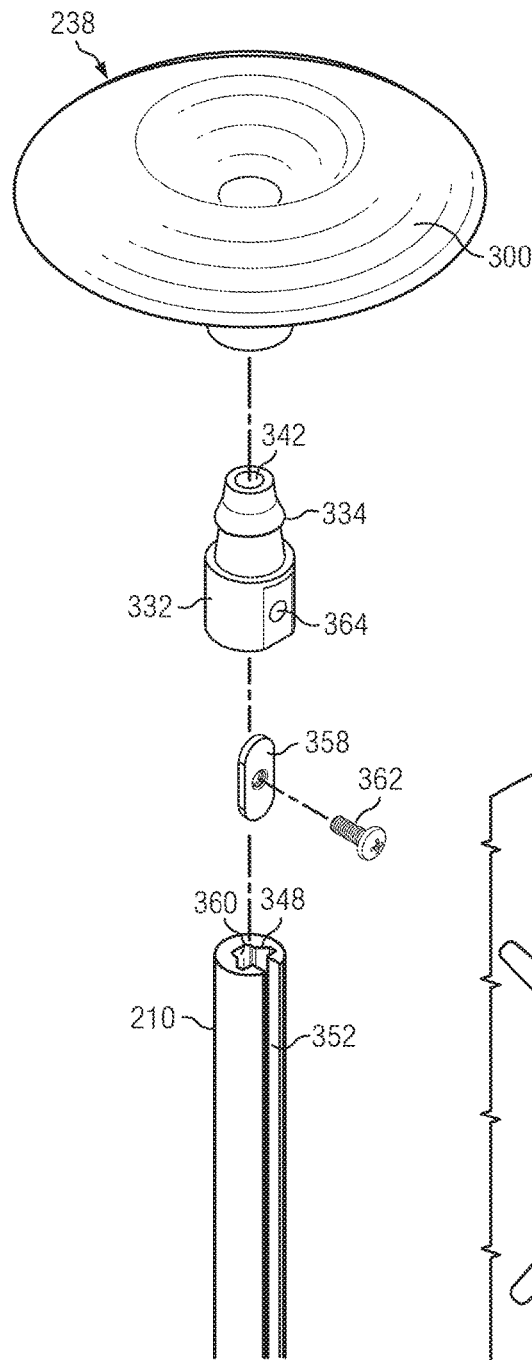
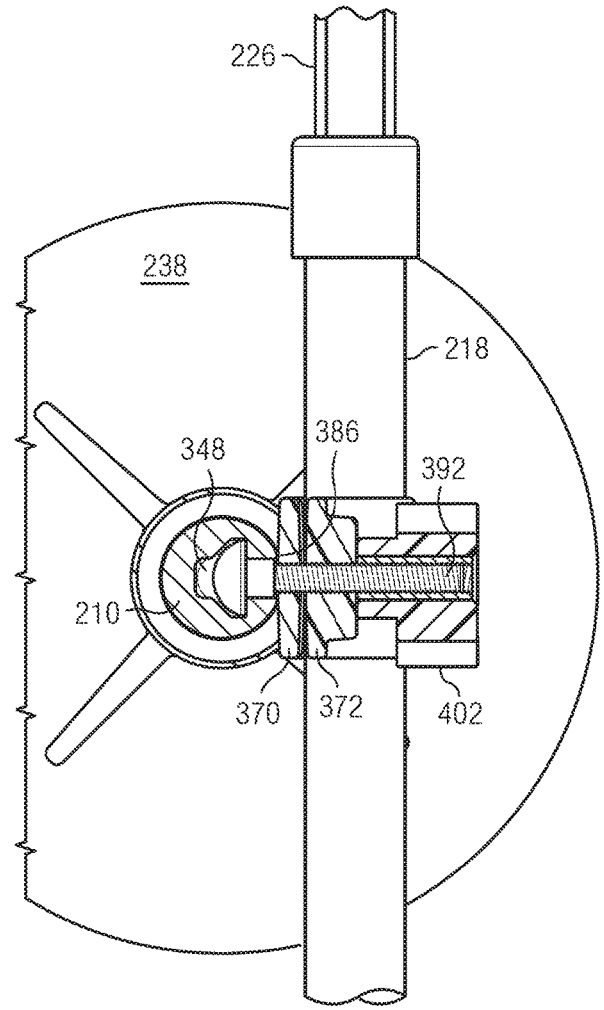
FIG. 9
FIG. 10

PET BARRIER

BACKGROUND OF THE INVENTION

Dogs are muscular and agile creatures. Their owners often want to restrict them to the cargo areas of minivans, SUVs, station wagons and like vehicles, but the dogs in question often have other ideas. The dog will often simply leap from the cargo area over the last row of seats—and sometimes over the next row of seats as well. Without modification, a typical vehicle interior presents little impediment to a dog prancing its muddy paws on passengers and their seating and anointing all of the vehicle's side windows with nose juice.

To restrict dogs' boisterous activity and the concomitant mess, pet barriers have been developed which can be installed in vehicle interiors immediately behind a row of seats. One such pet barrier is seen in FIG. 1. The prior art pet barrier 100 has left and right poles or stanchions 102 and 104. Each pole 102, 104 has a threaded cylindrical steel rod 106 that is slidably received within a respective steel tube 108. A top end of the steel tube 108 has a diminished diameter and receives a top cup 110 that is formed from a somewhat yieldable plastic. The cup 110 has a thin sidewall and terminates in a thin annulus 112 that contacts the vehicle headliner. The annulus 112 is so thin that the vehicle headliner is often permanently marred by the cup 110 being pressed into it. The top cup 110 has a limited ability to conform to a typically concave surface formed by the headliner, particularly at the corners where the headliner transitions to the side of the vehicle interior.

The barrier 100 includes at least two fences 114, 116, installed on the poles 104, 106 to be vertically spaced from each other. Taking fence 114 as an example, the fence 114 is affixed to the steel tubes 108 by two plastic brackets 118. Each bracket 118 has a cylindrically-shaped body that is slotted at its rear (not shown) so that the bracket 118 may be snapped onto a respective pole tube 108. Each bracket 118 is fastened with a screw or bolt that clamps the bracket 118 to the tube 104 or 106 and also tightens the bracket 118 around the fence 114 or 116. Once tightened, these are not easily adjusted. Each bracket 118 has an upper fence attachment member 120 and, vertically spaced from it, a lower fence attachment member 122. The fence attachment members 120, 122 have bores 124, 126 that receive respective steel fence tubes 128, 130.

Each fence tube 128, 130 has a left end 132 and a right end 134 onto which are installed plastic caps 136. Each cap has a central bore for receiving a respective end of a metal slide 138, curved after the fashion of a trombone slide. The slides 138 slide within tubes 128, 130 and may be moved by the consumer to appropriate positions. The slides 138 retain their lateral positions by frictional force alone.

Each threaded rod 106 terminates in a hollow bottom cup 140 formed of somewhat yieldable plastic. The cups 140 have thin sidewalls and terminate in a bottom annulus 142 that is thin, and which has a tendency to mar the supporting surface into which it is pressed in use. Each threaded rod 106 further has a wingnut 144 that is threaded onto it. The wingnut 144 supports a bottom end 146 of the steel pole tube 108. In order to install the poles 102, 104 into the vehicle interior, the user turns the wingnut 144 on the rod 106 until the length of the pole 102 or 104 extends completely between the headliner and the supporting surface. The user then turns the wingnut 144 a few more revolutions so that the pole 102 or 104 is press-fit between the headliner and the bottom supporting surface. Wingnut 144 is the only means by which the length of the pole 102 or 104 may be adjusted, and getting the pole to the right length can be a tedious exercise. Further, and prior to installation, the wingnut 144 does not prevent the threaded rod 106 from simply falling out of the bottom of the pole tube 108.

A further fence 148 optionally may be installed on pole tubes 108 by associated fence brackets 150 and 152, but the positioning of the optional fence 148 is limited by the length of the pole tube 108 and cannot be installed on the threaded rods 106.

The barrier 100 could be improved at least from the standpoints of its installability into vehicles without damaging the vehicle headliner and the support surface, its conformability to concave surfaces of the vehicle interior, its adaptability to vehicle interiors of various heights, and the time that it takes to adjust the poles to appropriate lengths.

SUMMARY OF THE INVENTION

According to one aspect of the invention, an improved pet barrier has first and second poles that are spaced apart from each other on respective axes that are parallel to each other. The poles each extend from a first vehicle interior surface, such as a floor of a cargo area, to a second vehicle interior surface, such as the vehicle headliner. At least one fence is disposed in a direction orthogonal to the pole axes and is affixed to each pole. Each pole has first and second ends. At least the first ends of the poles each terminate in a resilient support foot. Each support foot has a continuously convexly curved contact surface for contacting the vehicle interior surface, the foot contact surface being shaped somewhat like a hemitoroid or a sliced bagel. The contact surface has a near end near the pole axis and a far end remote from the axis. An angle of the contact surface at its near end is less than ninety degrees relative to the axis. An angle of the contact surface at its far end is more than ninety degrees relative to the axis. The contact surface further has a locus, between the near end and the far end, at which the angle relative to the axis is ninety degrees.

The pet barrier poles are each held in place by pressure on the headliner and on an opposed vehicle interior surface such as a cargo area floor. The resilient feet each present an expanded surface area to the vehicle interior surface, creating an annulus of contact that is disposed at a considerable radius from the pole axis. Not only is the pressure on the vehicle surface distributed over a greater surface area, the distance of the contact footprint from the pole axis increases stability. Further, the resilient foot may be bent so as to be considerably canted off of the pole axis, thereby conforming to the often curved surfaces of the vehicle interior, such as concave corners of a vehicle headliner. In one embodiment, such resilient feet are provided for each pole end.

According to another aspect of the invention, an improved pet barrier has first and second poles that are each disposed on a respective vertical axis. At least one fence is elongate in a horizontal direction and is affixed to each of the poles. Each pole has a coarse adjustment mechanism and a fine adjustment mechanism, by which the overall height of the pole may be adjusted to the height of a particular vehicle interior. To form the coarse adjustment mechanism, the pole may include an outer tube and an elongate upright slidably received in an upper end of the tube. A coarse adjustment pin extends radially outwardly from the outer surface of the upright. An elongate slot, aligned to the pole axis, is formed through the sidewall of the tube. Each of a plurality of vertically spaced-apart coarse adjustment slots are formed through the tube sidewall to communicate with the elongate vertical slot and to extend angularly from the vertical slot. To effect a coarse adjustment of the pole, the user moves the coarse adjustment pin along the vertical slot to a selected one of the coarse adjustment slots, and then twists the tube relative to the elongate upright to seat the coarse adjustment pin in the selected coarse adjustment slot.

The fine adjustment mechanism may be constituted by a threaded post and a cooperating nut. An upper end of the post is slidably inserted into a lower end of the tube of the pole. A section of the post extending downward from its upper end is threaded. A fine adjustment nut has a radially inwardly extending flange at its upper end that engages a circumferential groove formed in the pole tube sidewall. The lower end of the nut has threads that engage the threads of the post. When the nut is turned, the post acts like a lead screw and will advance out of or be retracted into the lower end of the tube. In one embodiment, a lower section of the tube is noncircular, and cooperates with a noncircular cross section of the post in such a way that the post will not rotate inside of the tube when the nut is rotated on the tube and on the post, permitting the operation of the fine adjustment mechanism with one hand. In one embodiment the nut is equipped with radially extending, angularly spaced apart flanges that permit the nut to be turned by hand. The combination of the coarse height adjustment mechanism and the fine height adjustment mechanism permits a quick and firm installation of the pet barrier poles into the vehicle interior.

In a further aspect of the invention, a pet barrier has first and second poles for extension between a vehicle floor and a vehicle headliner. The poles are parallel to each other and horizontally spaced apart from each other. Each pole is disposed on a respective vertical axis and has a vertical member with a front surface. The pet barrier further has at least one fence with upper and lower cross bars that are disposed to be horizontal, in parallel to each other and vertically spaced from each other.

For each pole, there is provided a fence clamp for clamping the upper and lower cross bars of the fence to the pole. The fence clamp has an elongate rear strap that is disposed adjacent the front surface of the pole's vertical member. An elongate front strap of the clamp is spaced forward of the rear strap when the clamp is in an unclamped condition. At least the front strap of the clamp is formed of a resilient material. The front and rear straps each have upper and lower ends. An upper cross bar gripping portion of the clamp connects together the upper ends of rear and front straps. A lower cross bar gripping portion of the clamp connects together the lower ends of the rear and front straps. The rear and front straps each have fastener holes located between their respective upper and lower ends.

For each clamp, a fastener is provided for fastening the upper and lower cross bars to the vertical member of the pole. The fastener includes a threaded shaft that extends forwardly from the front surface of the vertical member, extends through the fastener holes of the rear and front straps, and engages a knob. Rotation of the knob in a predetermined direction causes the front strap of the clamp to deflect toward the rear strap such that the clamp assumes a clamping condition. In this condition, the fence clamp applies a clamping pressure to the cross bars of the fence.

In one embodiment the vertical member of the pole has an axially aligned channel with a channel interior whose transverse width is greater than a transverse width of a channel throat. The fastener is slidable along the channel when the clamp is in an unclamped condition, but is affixed to the vertical member when the clamp is in a clamped condition. In one embodiment the fastener includes a bolt whose head rides in the vertical member channel interior. In one embodiment, this bolt is a carriage bolt including a square section of the shaft having a dimension that permits the bolt to slide in the channel throat but is close enough to the transverse width of the channel throat that the carriage bolt is precluded from rotating relative to the vertical member of the channel.

In one embodiment, a kit is provided that includes the above pet barrier assembly but also includes a collar for snapping over an outer tube of the pole. A bolt is inserted through a front plate in the collar, the fastener hole in the rear strap and the fastener hole in the front strap. The kit permits the installation of a fence at a lower elevation above the vehicle floor, where it intersects the outer tube of the pole rather than the elongate upright of the pole.

The clamp of the invention permits the fastening in place of the cross bars, and the affixation of the clamp to the pole, by turning the knob of a single fastener with one hand, greatly aiding in quick assembly.

BRIEF DESCRIPTION OF THE DRAWINGS

Further aspects of the invention and their advantages can be discerned in the following detailed description as read in conjunction with the drawings of exemplary embodiments, in which like characters denote like parts and in which:

FIG. 3A is an axial sectional detail of the pet barrier shown in FIG. 2, showing an upper end of a pet barrier pole, an upper elastomeric foot, upper and lower cross bars of a fence and a fence clamp;

FIG. 3B is an axial sectional detail from the same viewpoint as that shown in FIG. 3A, but illustrating the fence clamp in a clamped condition;

FIG. 9 is an exploded perspective detail of an upper foot, upper pole end fitting and pole upright;

FIG. 10 is a top sectional view taken through a fence clamp in a clamped condition;

DETAILED DESCRIPTION

Figure 1:
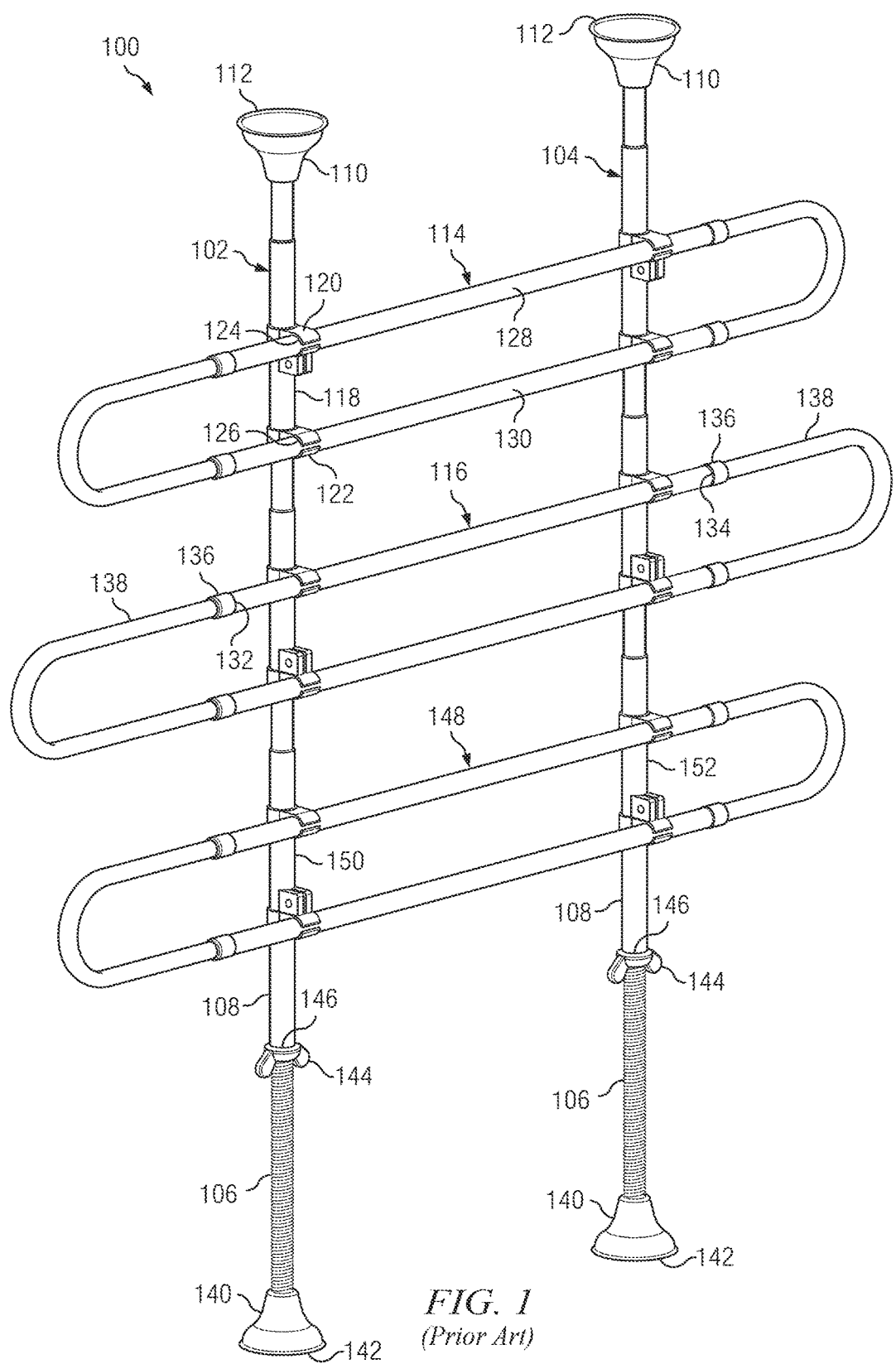
FIG. 1 is a perspective view of a pet barrier according to the prior art.
Figure 2:
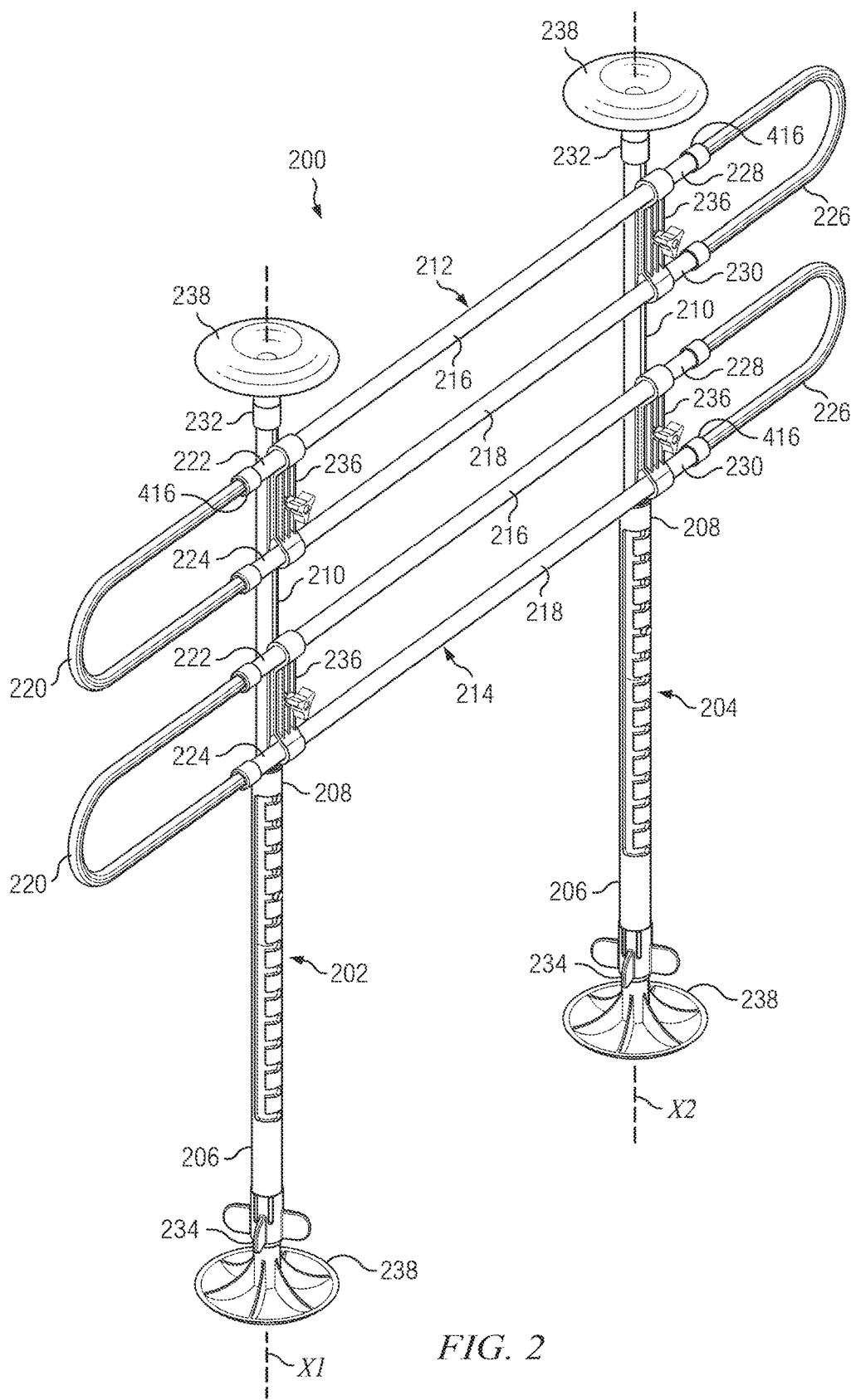
FIG. 2 is a perspective view of a pet barrier according to one embodiment of the invention.

An improved pet barrier according to the invention is indicated generally at 200 in FIG. 2. Pet barrier 200 includes a first (left) pole 202 and a second (right) pole 204. In use, the poles 202, 204 are disposed on respective vertical axes X1 and X2, are transversely spaced apart from each other, and are parallel to each other. As used herein, "transverse" means a horizontal, side-to-side direction that is orthogonal to the vertical and is orthogonal to the direction of vehicle travel. As used herein, "longitudinal" means a horizontal, fore-and-aft direction that is orthogonal to the vertical, is orthogonal to the transverse direction, and is parallel to the direction of vehicle travel. Each pole 202, 204 has an outer tube 206 and, slidably received into an upper end 208 of the outer tube 206, an elongate vertical upright 210.

The other major components of pet barrier 200 include at least one, and in many embodiments two, fences 212, 214. Each fence 212, 214 has an upper, transversely disposed, tubular cross bar 216 and a lower, transversely disposed, tubular cross bar 218. Cross bars 216, 218 are parallel to each other. Each fence 212, 214 further has a left trombone slide 220 whose free ends are inserted into left ends 222, 224 of the cross bars 216, 218, and a right trombone slide 226 whose free ends are inserted into right ends 228, 230 of the cross bars 216, 218. FIG. 2 shows the pet barrier as mounting two fences 212, 214. In other configurations, only a single fence 212 may be necessary, or a third fence (not shown, but see FIG. 15) may be added. The fences 212, 214 impose barriers to pets jumping over passenger seats and the like.

Each pole 202, 204 has an upper end 232 and a lower end 234. The distance between ends 232 and 234 defines the height of the pole. The height of the pole 202 or 204 may be coarsely adjusted to the height of a vehicle interior by adjusting the degree to which the elongate upright 210 extends upwardly out of the pole tube 206, in a manner that will be described below.

The fences 212, 214 are affixed to the poles 202, 204, and in this configuration more particularly to the elongate uprights 210 thereof, by respective fence clamps 236. At least the upper pole ends 232, and in the illustrated embodiment the lower pole ends 234 as well, are terminated by respective elastomeric feet 238. The elastomeric feet 238 are pressed into the surfaces of the vehicle interior to affix the pet barrier 200 in the vehicle.

Figure 5:
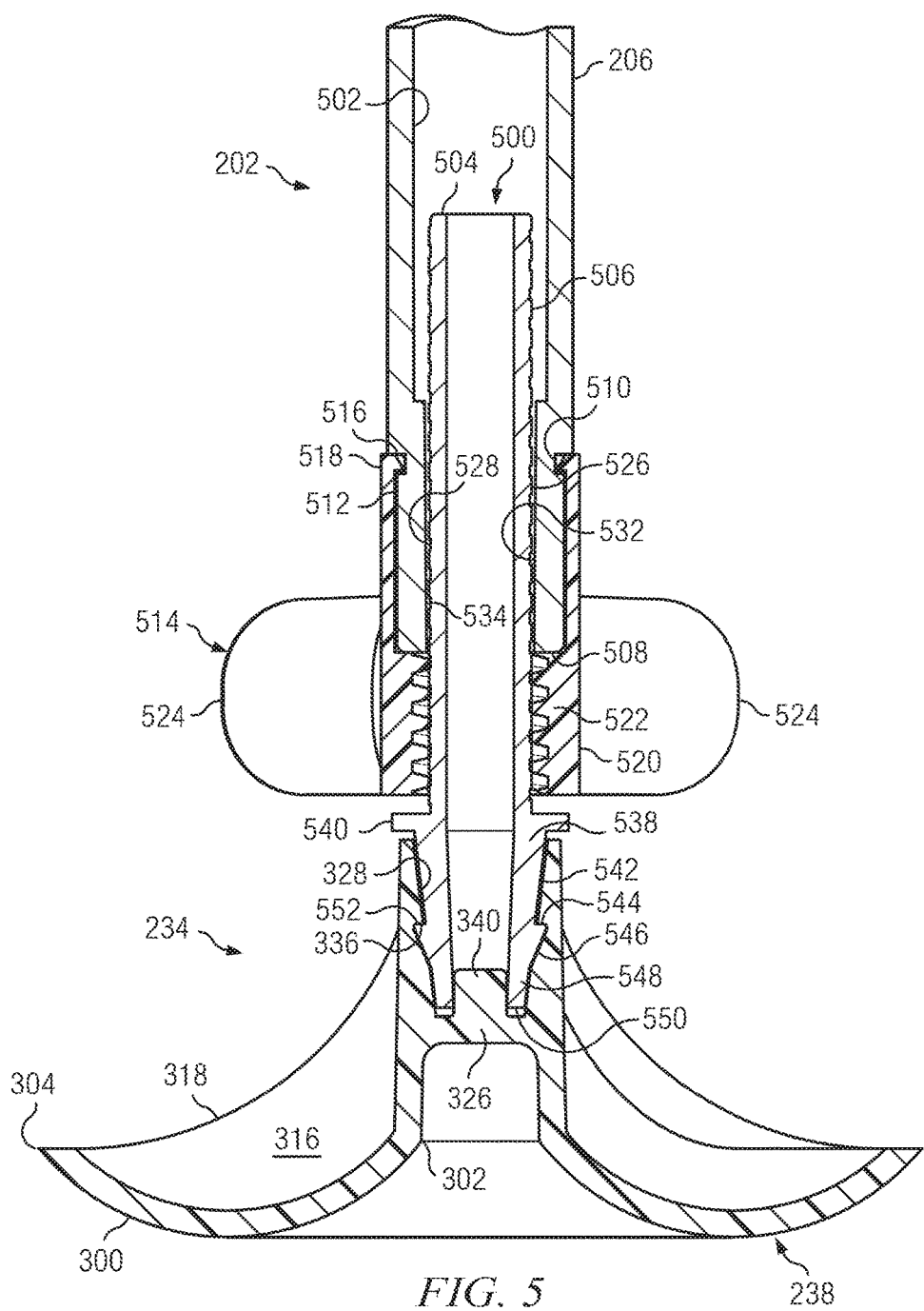
FIG. 5 is an axial sectional detail of a lower section of a pet barrier pole, fine adjustment mechanism and elastomeric foot.

FIG. 3A is an axial sectional view of an upper end 232 of pole 202 and the pet barrier components assembled to it. See also FIG. 9. The foot 238 is disposed on a vertical axis X. The illustrated foot 238 is presenting its contact surface 300 upward, which in this figure is the contact surface direction. The opposite direction is the pole end direction, and in FIG. 3A is downward. As terminating a lower pole end 234, as seen in FIGS. 2 and 5, the contact surface direction would be downward and the pole end direction would be upward.

The contact surface 300, as seen from a point of view spaced from the surface 300 in the contact surface direction, is continuously convexly curved. The contact surface 300 has a shape that is somewhat like that of a hemitoroid or the convex surface of a sliced bagel. The contact surface has a near end 302 that is proximate axis X, and a far end 304 that is remote from axis X. Ends 302, 304 are both annular. An angle α of the contact surface 300 with respect to axis X, taken at near end 302, is less than ninety degrees, and in one embodiment may be about 40 degrees. An angle of the contact surface 300 with respect to axis X, taken at far end 304, is more than ninety degrees, and in one embodiment may be about 135 degrees. The contact surface 300 has an annular locus 306, located on the surface 300 somewhere between near end 302 and far end 304, at which the surface angle is exactly 90 degrees with respect to axis X.

Figure 3C:
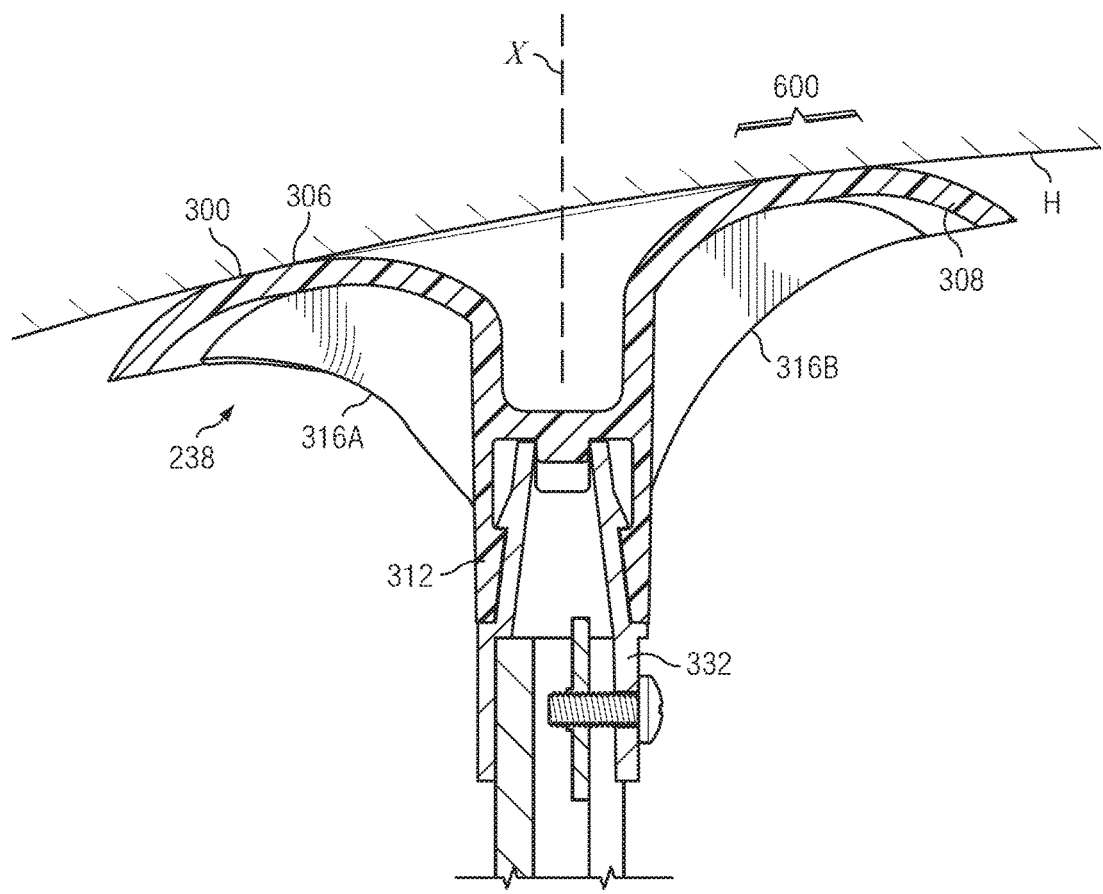
FIG. 3C is an axial sectional detail taken from the same viewpoint as FIG. 3A, showing the deformation of an elastomeric foot as it contacts a vehicle headliner.

The foot 238, in the illustrated embodiment, is molded of one piece out of an elastomer, such as a thermoplastic elastomer (TPE). FIG. 3A shows foot 238 in an uncontacted condition in which its shape is not distorted. FIG. 3C shows foot 238 as deformed under a compression load caused by its being pressed into a vehicle headliner surface H that is not orthogonal to axis X but is slanted. As pressed into vehicle interior surface, such as vehicle headliner H, the surface 300 will tend to flatten out and form a flat annulus 600 around locus 306. The radius from axis X of this flat annulus 600, or of the contacting portion of surface 300 more generally, will be substantial. Not only does this expand the contact surface area and make the force on e.g. the headliner at any particular point less, but the contacted surface will also exert an enhanced resistance to pole 202 changing its angular position, because of its large moment arm of the contacted surface with respect to axis X. This makes the pole as installed more stable and less able to be shifted sideways.

FIG. 3C also shows how the elastomeric foot 238 will deform when bent off-axis, as when it contacts a headliner H that is not horizontal; throughout much of its area, a headliner of a vehicle interior will not be planar but instead will be concavely curved, with this tendency becoming more pronounced as the headliner H transitions to a vehicle side. Contact surface 300 will simply cant to an off-axis position so that it meets headliner H. Flexible gusset 316A will fold or slightly buckle, while opposed gusset 316B will be stretched. Both gussets 316A and 316B will continue to support and stiffen the contact sidewall 308. The pet barrier as employing the elastomeric feet 238 is therefore capable of adapting to a variety of headliner shapes.

In the illustrated embodiment, the contact surface 300 is formed by a contact sidewall 308 of substantially uniform thickness. The sidewall 308 has an opposed or lower surface 310 that in general follows the contour of surface 300; surface 310 is continuously concavely curved as viewed from a point spaced from it in the pole end direction. At or about near end 302, the contact sidewall 308 joins a sidewall 312 having a cylindrical outer surface 314. The foot 238 further has a plurality of thin gussets or ribs 316 that each extends, in a pole end direction, from the opposed surface 310. Each gusset 316 may conform to a radius from axis X and may have a far margin 318, displaced from surface 310, that is concavely curved as viewed from a point spaced from foot 238 in the pole end direction. The far margin 318 may extend from a point 320 on the outer surface 314 of the cylindrical sidewall 308, to a point 322 on surface 310 that is close to far end 304 of contact surface 300. Gussets 316 stiffen the contact surface 300, and as described above have the capability of stretching or buckling so as to permit the surface 300 to contact a nonplanar vehicle surface. Their number, thickness and depth in a pole end direction may be varied to vary the stiffness that the foot 238 will exhibit against bending off-axis and against deformation under pressure.

In the illustrated embodiment, the contact surface 300 is annular in that it surrounds a central cavity 324. In other embodiments, the contact surface near end 302 may be a single point rather than an annulus, such that the contact surface 300 will be continuous in transverse and longitudinal directions. In the illustrated embodiment, a web 326 closes off the bottom of substantially cylindrical cavity 324.

The foot cylindrical sidewall 312 has an interior surface 328 that is adapted to mate with an external surface 330 of a pole end fitting 332. The pole end fitting 332 may be molded of a plastic that is hard relative to the elastomer used to mold foot 238, and can be molded of ABS plastic. The surface 330 has an annular barb or discontinuity 334 that mates with a v-shaped annular groove 336 in the foot interior surface 328; the barb 334 and groove 336 can be made up of intersecting frustoconical surfaces of different pitches. In assembly, the cylindrical sidewall 312 is elastically pressed over and onto the external surface 330 of the fitting 332, such that the barb 334 seats in groove 336. This provides a measure of resistance to foot 238 being detached from the pole end fitting 332. Further, a lower or inner surface 338 of web 326 has formed on it a (in this figure) downwardly depending nipple or peg 340. In the illustrated embodiment, the pole end fitting 332 has a hollow upper end 342. The nipple 340 fits within the hollow upper end 342 of fitting 332 to provide a further measure of resistance to the elastomeric foot 238 from camming or tearing off of the pole end fitting 332.

A lower end 344 of the pole end fitting 334 fits over an upper end 346 of the vertical upright 210. In the illustrated embodiment, the upright 210 has a channel 348 that has a uniform cross section through its entire length and therefore the upright 210 can be formed as an extrusion. The upright 210 may be formed of a metal such as aluminum. The upright 210 has an external surface 350 that is cylindrical except where a throat 352 of channel 348 opens onto it. An inner surface 354 of the lower end 344 of pole fitting 334 mates with upright external surface 350. A radially inwardly extending tab 356 of fitting lower end 344 fits into channel throat 352. A flat nut 358 is disposed in a channel interior 360. A bolt 362 is inserted through a hole 364 in the fitting lower end 344 and through channel throat 352 to be threaded to flat nut 358.

The fence clamp 236 includes a vertically oriented, elongate rear strap 370 that typically is assembled to adjoin the external surface 350 of the upright 210. The fence clamp 236 further has a vertically oriented front strap 372 that is forward of the rear strap 370 (to the right in FIG. 3A). An upper end 374 of the rear strap 370 is joined to an upper end 376 of the front strap 372 by an upper cross bar gripping portion 378. A lower end 380 of the rear strap 370 is joined to a lower end 382 of the front strap 372 by a lower cross bar gripping portion 384. At least the front strap 372 is formed of a somewhat elastic, resilient but stiff material. In the illustrated embodiment, the rear strap 370, the front strap 372, the upper cross bar gripping portion 378 and the lower cross bar gripping portion 384 are integrally molded as a single unit from a suitable plastic, such as ABS.

FIG. 3A shows fence clamp 236 in an unclamped condition, in which a rear surface of front strap 372 is spaced from a front surface of the rear strap 370; in an unclamped condition, front strap 372 "floats" relative to rear strap 370. FIG. 3B and FIG. 10 show fence clamp 236 in a clamped condition, in which it is clamping upper cross bar 216 and lower cross bar 218 in place to a front surface 386 of the vertical upright 210. The front strap 372 and the rear strap 370 have respective fastener holes 388, 390 that are located between upper strap ends 374, 376 and lower strap ends 380, 382 and are in alignment with each other. A carriage bolt 392 has an enlarged head 394 that slides within channel interior 360. A square section 396 of the carriage bolt shaft has a cross-sectional square shape that slidably fits within channel throat 352, the fit being sufficiently close that the carriage bolt 392 cannot turn relative to upright 210. A distal, threaded portion 398 of the bolt 390 is inserted through the rear strap fastener hole 390 and the front strap fastener hole 388. The threaded portion 398 of the carriage bolt 392 is threaded into a metal sleeve 400 of a knob or thumb nut 402.

In the clamped condition, the thumb nut 402 is tightened on carriage bolt 394 by being rotated in a predetermined direction (typically clockwise), causing the front strap 372 to rearwardly deflect or bow until a rear surface of the front strap 372 abuts the front surface of the rear strap 370. In this condition, three clamping actions occur. The upper cross bar gripping portion 378 clamps to the upper cross bar 216, the lower cross bar gripping portion 384 clamps to the lower cross bar 218, and the entire fence clamp 236 is clamped to the front surface 386 of the vertical upright 210. Conversely, when the fence clamp is in an unclamped condition as shown in FIG. 3A, the upper cross bar 216 will be free to move within upper cross bar gripping portion 378, the lower cross bar 218 will be free to move within lower cross bar gripping portion 384, and the fence clamp 236 will be able to be slid vertically up or down the vertical upright 210.

In an alternative embodiment (not shown), the clamp fastener may be constituted by a thumbscrew having a threaded shaft which is affixed to the knob 402, which is inserted rearwardly through front strap fastener hole 388, rear strap fastener hole 390 and channel throat 352, and which is threaded into a flat nut disposed in the channel interior 360.

Figure 4:
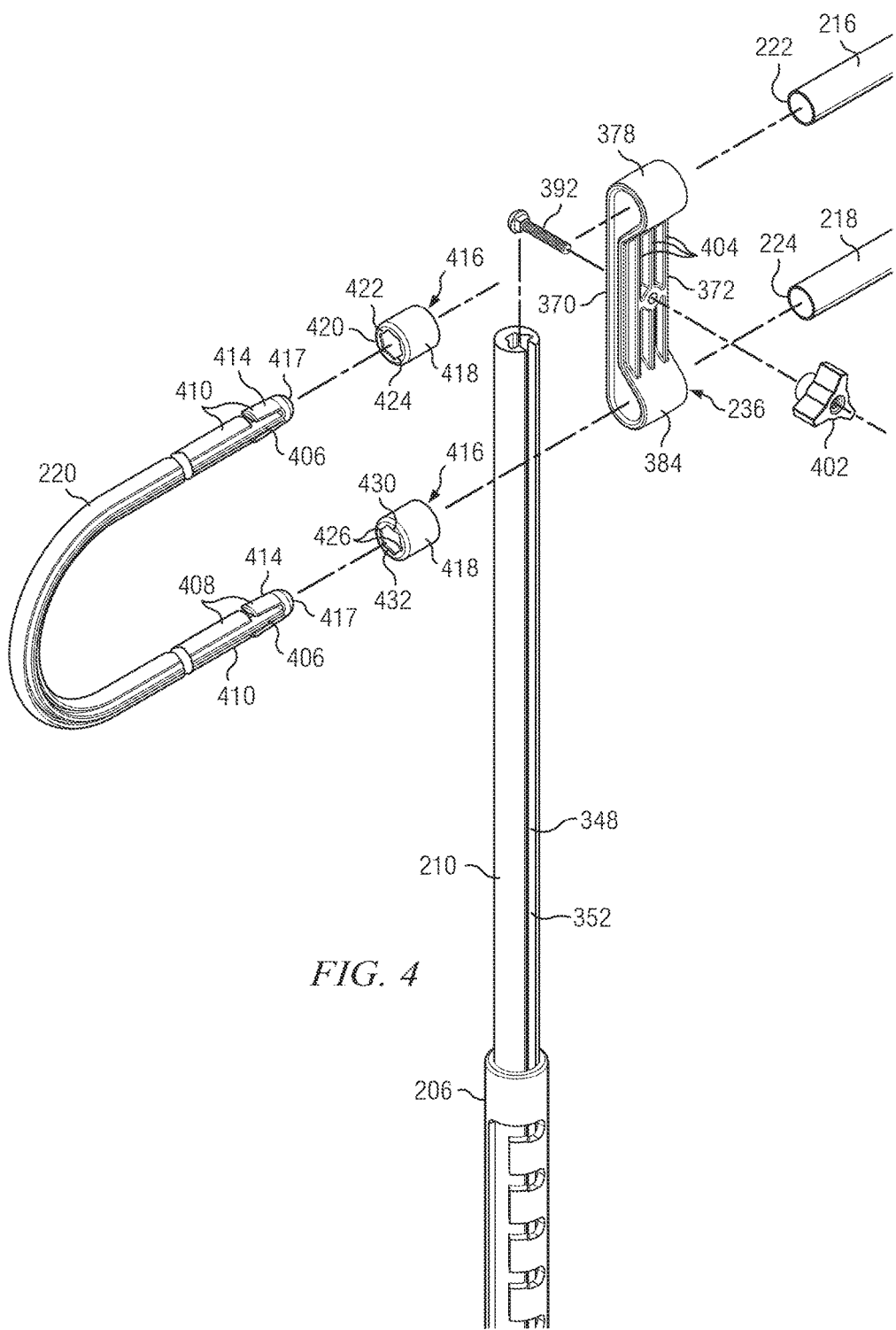
FIG. 4 is an exploded perspective detail view of a pole, fence and fence clamp.

A fence clamp 236 in an unclamped condition is also shown in FIG. 4. The relative stiffness or elasticity of front strap 372 may be modified by including one or more vertically elongate, longitudinally disposed ribs 404 that extend forwardly from a front surface of the front strap 372. The ribs 404 may be transversely spaced apart from each other and terminate at upper cross bar gripping portion 378 at their upper ends and at lower cross bar gripping portion 384 at their lower ends. In the illustrated embodiment, upper cross bar gripping portion 378 takes the form of an almost complete cylinder that wraps around the outer surface of the upper cross bar 216, and lower gripping portion 384 has a similar form. The circumferential gripping portions 378, 384 will tend to constrict as the front strap 372 is forced toward rear strap 370, clamping the cross bars 216, 218 in place. The reinforcing ribs 404 aid in the transmission of clamping force from the centered nut 402 to each of the gripping portions 378, 384, effectively closing up their diameters to clamp to the cross bar tubes 216, 218.

In the illustrated embodiment, each trombone slide 220 is molded of a suitable plastic such as glass fiber reinforced polypropylene and is fluted rather than hollow in section, as shown in FIGS. 3A and 3B. The slide 220 may have a central web or lobe 406 that is greater in width than either of two flanking webs or lobes 408 and 410. The lateral slide lobes 406, 408 and 410 are connected together by a central vertical web 412 that is formed at ninety degrees to lobes 406, 408 and 410. As seen in FIG. 4, slide 220 is U-shaped and has two free ends, each of which is terminated by a barb 414. The central lateral lobe 406 continues into the barb 414 but the top and bottom lobes 408, 410 are interrupted and, within the lengths of the barb 414, the vertical web 412 is missing. Within the barb 414, the top and bottom lobes become fingers having a diameter that is greater than the inner diameter of cross bars 216 or 218. These fingers inwardly deflect upon installation, and create a resistance to sliding or rattling. All of the webs 406-410 are joined at a blunt barb nose 417. Within barb 414, the width of central lateral lobe 406 may be reduced from the width that it has in the rest of slide 220, for ease in inserting the barb 414 into an end 222 or 224 of the cross bars 216 or 218.

In one embodiment, the cross bars 216, 218 are simple aluminum tubes. The ends 222, 224, 228, 230 of the cross bars 216, 218 may be capped by respective end pieces 416. Each end piece 416 has a cylindrical sidewall 418 that is press-fit over the external cylindrical surface of the cross bar 216 or 218. An outer end 420 of the end piece 416 has an inwardly extending lip 422 that has an inner hexagonal margin 424. Opposed lateral vertices 426 of the hexagonal margin permit the central slide web 406 to slide through end piece 416 into the cross bar interior. But a straight upper side 430 and a straight lower side 432 of hexagonal margin 424 will permit the insertion of webs 408 and 410 through the end piece 416, but will resist the extraction of interrupted webs or fingers 408 and 410 when an attempt is made to pull the slide 220 out of the cross bars 216 and 218. In this way, after slides 220 are assembled to the cross bars 216 and 218, they will not be later easily dissociated from them.

Figure 4A:
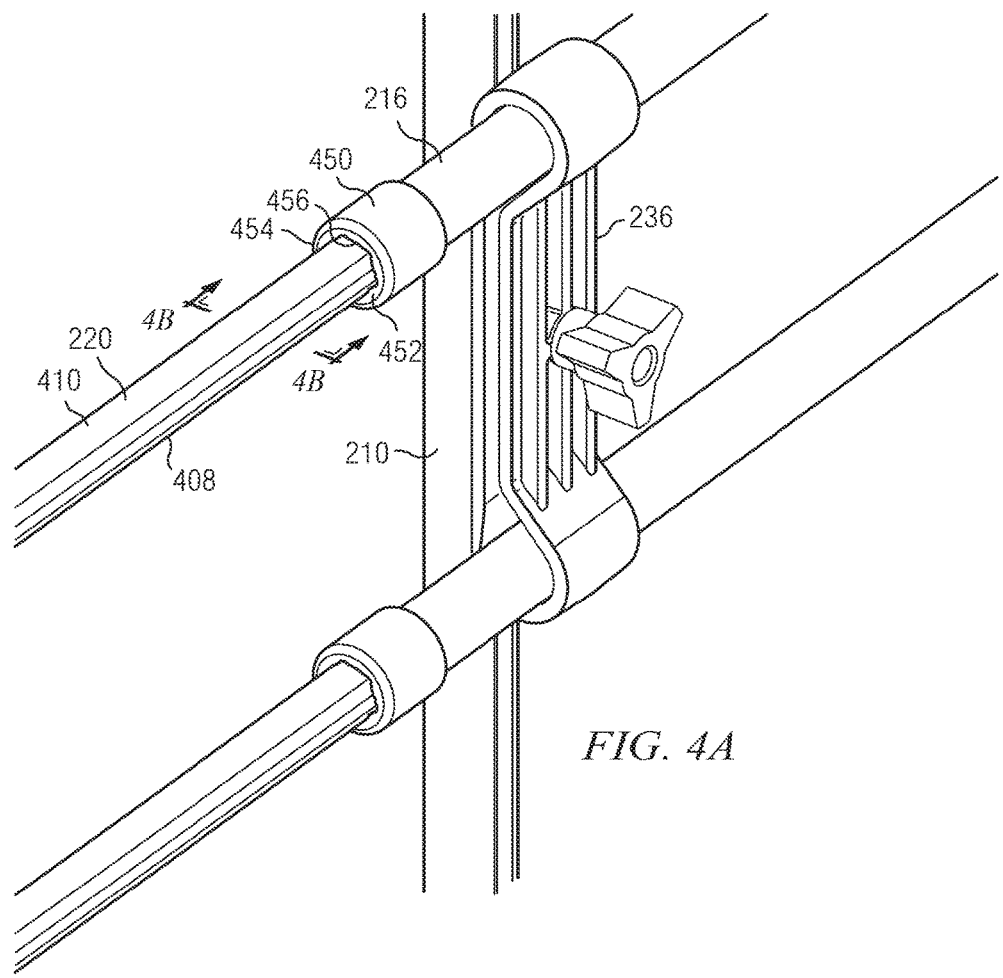
FIG. 4A is a perspective detail showing the use of an alternative cross bar end cap.
Figure 4B:
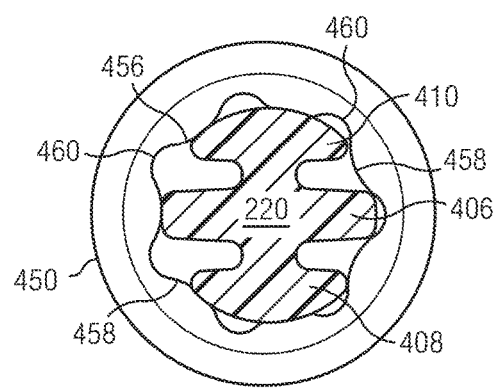
FIG. 4B is a sectional view taken substantially along Line 4B-4B of FIG. 4A.

FIGS. 4A and 4B illustrate the deployment of an alternative cross bar end cap 450. The end cap 450 generally is similar to end cap or piece 416, but has an inwardly extending lip 452 on its outer end 454 with an inner, substantially heptagonal margin 456. Margin 456 has seven sides 458, each of which is a convex arc relative to the cross bar axis. Margin 456 creates an interference fit with slide 220, as is shown in FIG. 4B. This interference fit will exist regardless of the angular orientation of the sides 458 and vertices 460. In assembling the end caps 450 onto the ends of the cross bars 216, 218, the assembler doesn't have to carefully line up sides 458 or vertices 460 to any external reference. Each cap 450 is simply press-fit onto the outer diameter of cross bar 216, 218, to which it will fit tightly. Since, like end piece 416, the end cap 450 preferably is molded from an elastomer such as TPE, the inner margin walls will slightly deflect so as to conform to lobes 406, 408 and 410. This slight deflection adds further resistance to sliding and rattling.

Figure 6:
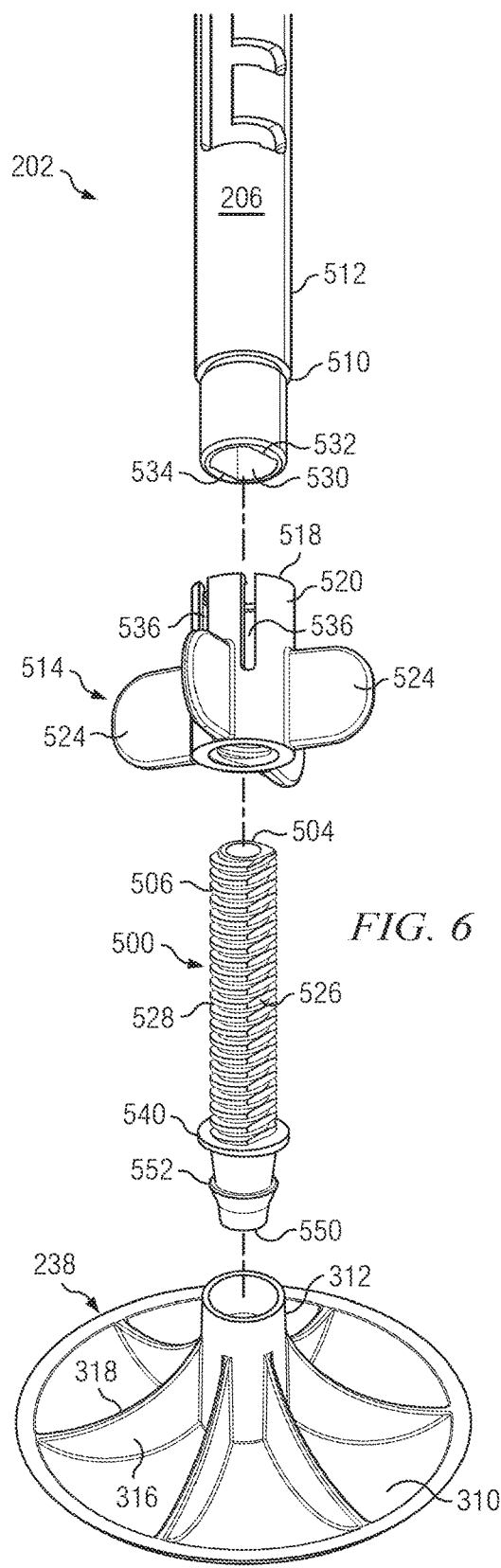
FIG. 6 is an exploded perspective detail of a lower section of a pet barrier pole tube, nut, post and lower foot.

FIGS. 5 and 6 show the deployment of an elastomeric foot 238 to terminate a lower end 234 of pole 202, pole 204 being similar. In this use, the contact surface 300 of the foot 238 is directed downward. A post 500 is slidably inserted into an unthreaded bore 502 of the pole tube 206. The post has an upper end 504 and a threaded section 506 that downwardly extends from the upper end 504. The threaded section 506 may be molded with acme threads. The tube 206 has a lower end 508 and, upwardly spaced from end 508, a circumferential groove 510 in its outer surface 512.

A nut 514 is snapped over the lower end 508 of tube 206. A flange 516 radially inwardly extends from an upper end 518 of the nut 514 to slidably engage the circumferential groove 510. The nut 514 has a sidewall 520 with a lower threaded section 522 whose threads engage with the threads on post threaded section 506. The nut 514 may be furnished with a plurality of wings 524, each of which is angularly spaced from the others and each of which extends radially outwardly from the nut sidewall 520. The wings 524 permit the turning of nut 514 around the pole axis by hand.

As cooperating with the circumferential groove 510 on the tube outer surface 512, the post 500 and the nut 514 form a mechanism whereby the height of pole 202 may be finely adjusted. When the installer turns the nut 514 with the aid of wings 524 in one direction, the post 504 will downwardly extend from the nut 514, acting like a lead screw. Conversely, when the installer turns the nut 514 the other way, the post 500 will be retracted into the tube 206.

A lower section of a pole 202 is shown in exploded view in FIG. 6. In one embodiment, the threaded section 506 of post 500 is not circular but rather has opposed flats 526, 528. This produces a noncircular cross-sectional shape that is closely received into a bore end 530 of the tube 506. The bore end 530 has an internal surface that is cylindrical except for flats 532, 534. The flats 532, 534 of bore end 530 cooperate with post threaded section flats 526, 528 to prevent the rotation of post 500 relative to tube 206. As a result, the installer merely needs to turn the nut with one hand to finely adjust the pole height, and does not have to grasp any other portion of the pet barrier to do it.

The nut 514 may be molded from a glass fiber reinforced nylon. The post 500 may be molded from a PC/PBT plastic. The sidewall 520 of nut 514 may be interrupted with slots 536 to permit the nut 514 to be snapped over the lower end 508 of the tube 206 and into groove 510.

Post 500 has a lower section 538 whose shape is intentionally similar to that of upper pole end fitting 332 (FIG. 3A). At or near the lower termination of the post threaded section 506, the post 500 may be equipped with a stop flange 540 that prohibits the retraction of post 500 into tube 206 beyond a certain point. Below the stop flange 540, the surface of lower section 538 is made up by a downwardly and radially inwardly extending first frustoconical section 542, then an outwardly extending surface 544, followed by a second, downwardly and inwardly extending frustoconical section 546, and a final frustoconical section 548 whose degree of inward taper is not as great as that of section 546 immediately above it. Frustoconical section 548 extends downwardly until it forms lower post end 550. The post end 550 is hollow so as to permit the nipple 340 of foot 238 to seat within it. Surfaces 542, 544 and 546 form a barb 552 that seats in foot groove 336 when the elastomeric foot 238 is press-fit onto the lower section 538 of the post 500. Because the lower section 538 of post 500 presents a shape that is identical to the upper portion of the external surface 330 of pole end fitting 332, the foot 238 may be pressed onto either end of the pole 202 and only one type of foot 238 needs to be provided with pet barrier 200.

Figure 8:
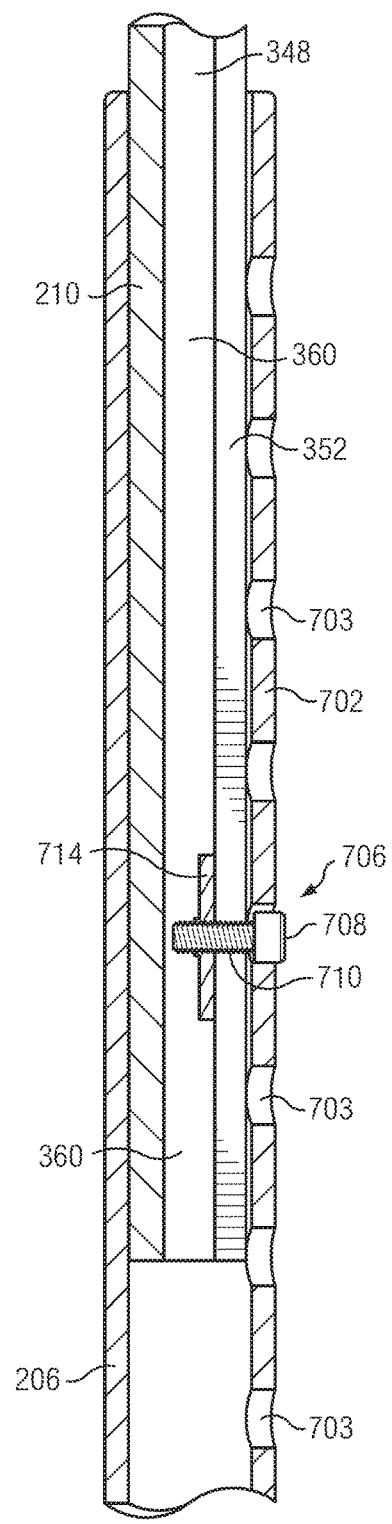
FIG. 8 is a sectional detail of a pole upright, pole tube and coarse adjustment pin.
Figure 7A:
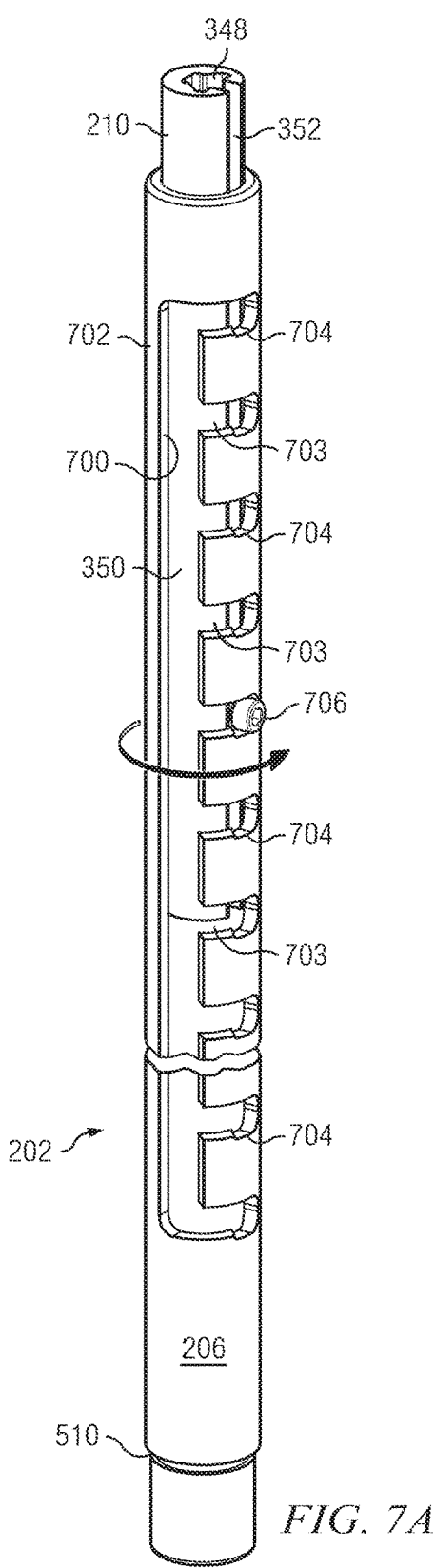
FIG. 7A is a detail showing a first step in a pole height coarse adjustment process.
Figure 7B:
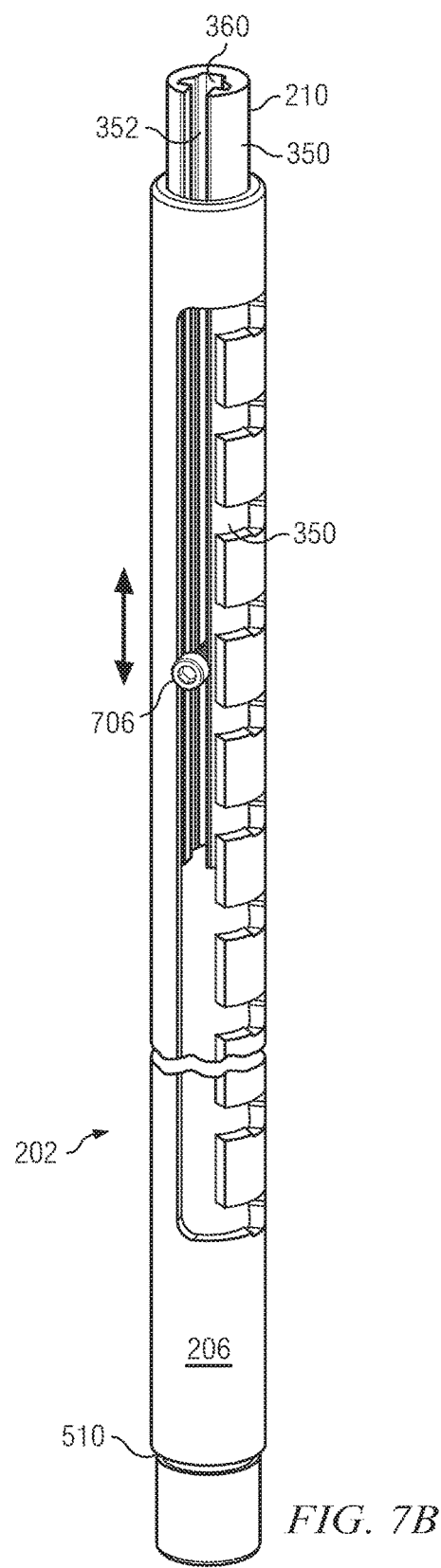
FIG. 7B is a detail showing a second step in a pole height coarse adjustment process.

The pet barrier pole 202's coarse adjustment mechanism is best seen in FIGS. 7A, 7B and 8. The tube 206 has an elongate, axially disposed slot 700 that is formed through the tube sidewall 702. The slot 700 communicates with each of a plurality of coarse adjustment slots 703 that angularly extend around the axis in one direction from the axial slot 700. Each of the coarse adjustment slots 703 is axially spaced from the nearest ones of the other slots 703 and may each terminate in a detenting enlargement 704 that is angularly spaced from the axial slot 700. Each detent 704 extends slightly downwardly from the slot 703 that it respectively terminates.

A coarse adjustment pin 706 extends radially outwardly from the external sidewall 350 of the upright 210. The pin 706 is sized so that it may slide within any of the coarse adjustment slots 703 and within axial slot 700. A diameter of the pin 706 is slightly smaller than the uniform diameter of each detent 704 so that the pin 706 will be detented by any detent 704 in which it resides.

To effect a coarse adjustment of the height of pole 202, the tube 206 is first twisted (to the right in FIGS. 7A and 7B) until the pin 706 is disposed within the axial slot 700. When the pin 706 is disposed in axial slot 700, the vertical upright 210 may be pulled out of tube 206 or slid into tube 206 to any of many different axial positions. This is shown in FIG. 7B. When the installer is satisfied with the coarsely adjusted pole height, the installer twists tube 206 in the opposite direction (to the left in FIGS. 7A and 7B), causing the pin 706 to enter a preselected one of the coarse adjustment slots 703. The twist continues until the pin 706 falls into the detent 704 at the end of the slot 703. The weight of vertical upright 210, plus the compressive force exerted by the pole 202 on the opposed vehicle interior surfaces between which it has been placed, will tend to keep the pin 706 in the selected detent 704.

While the detenting pin 706 could be formed by other structures, conveniently it may be constituted by the head of a cap screw 708. As seen in FIG. 8, a shaft 710 of the cap screw 708 is inserted through the channel throat 352 in the upright 210, at a position on upright 210 that is much lower than any position at which a fence clamp 236 would be mounted to upright 210. The cap screw shaft 710 is then threaded to a flat nut 714 that resides in the channel interior 360.

Figure 11:
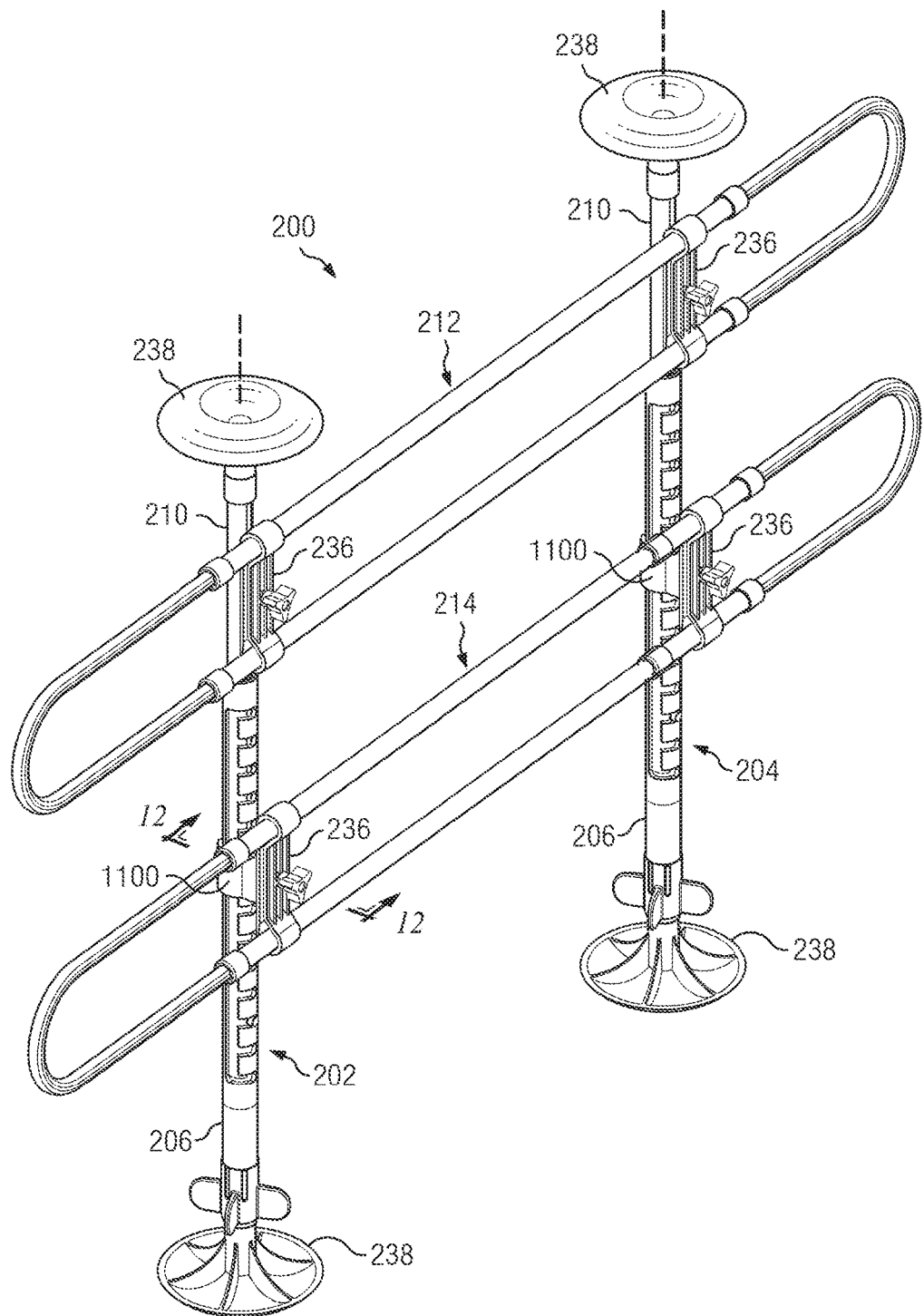
FIG. 11 is a perspective view of a pet barrier according to the invention and being used with a kit that permits the affixation of a fence to outer tubes of the pet barrier poles.
Figure 12:
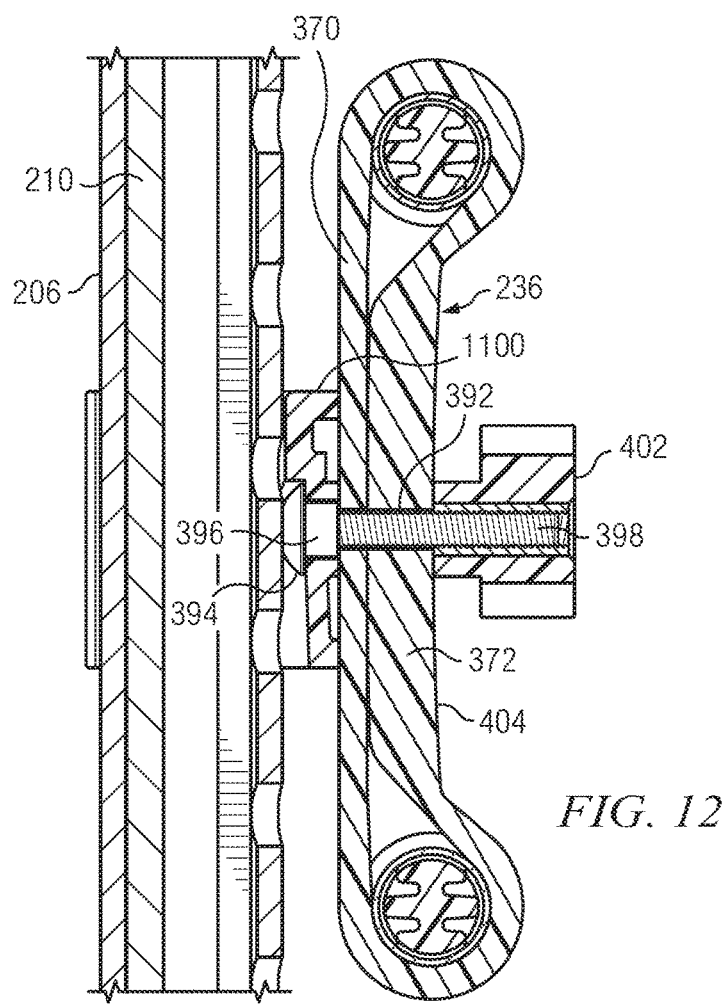
FIG. 12 is a longitudinal sectional detail showing the affixation of a fence clamp to a pole tube using an adapting collar.

FIG. 11 illustrates a configuration of the pet barrier 200 as it might be installed in a vehicle whose interior height in the cargo area is relatively small. In this configuration, the height of the poles 202, 204 has been adjusted such that not much of the vertical elongate uprights 210 upwardly extend out of the respective pole tubes 206. A first fence 212 is affixed to uprights 210 using fence clamps 236, as before. But a second fence 214 is affixed to the poles 202, 204 at a vertical position that intersects the pole tubes 206 rather than to the uprights 210. Therefore, the fence clamps 236 used to affix the fence 214 to the poles 202, 204 must affix the fence to the pole tubes 206 rather than to the uprights 210.

Figures 14A, 14B:
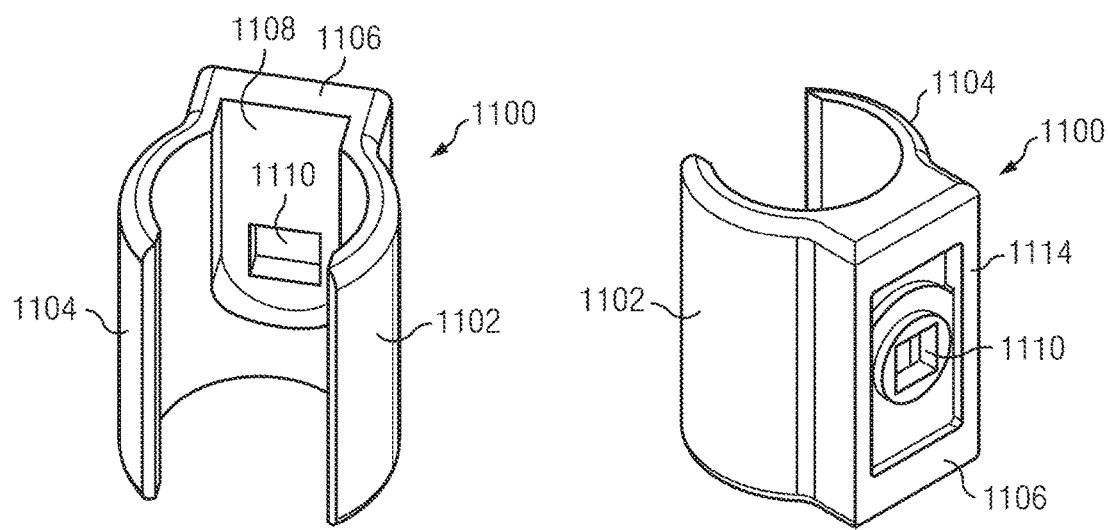
FIG. 14A is a front perspective view of an adapting collar.
FIG. 14B is a rear perspective view of the collar shown in FIG. 14A.
Figure 13:
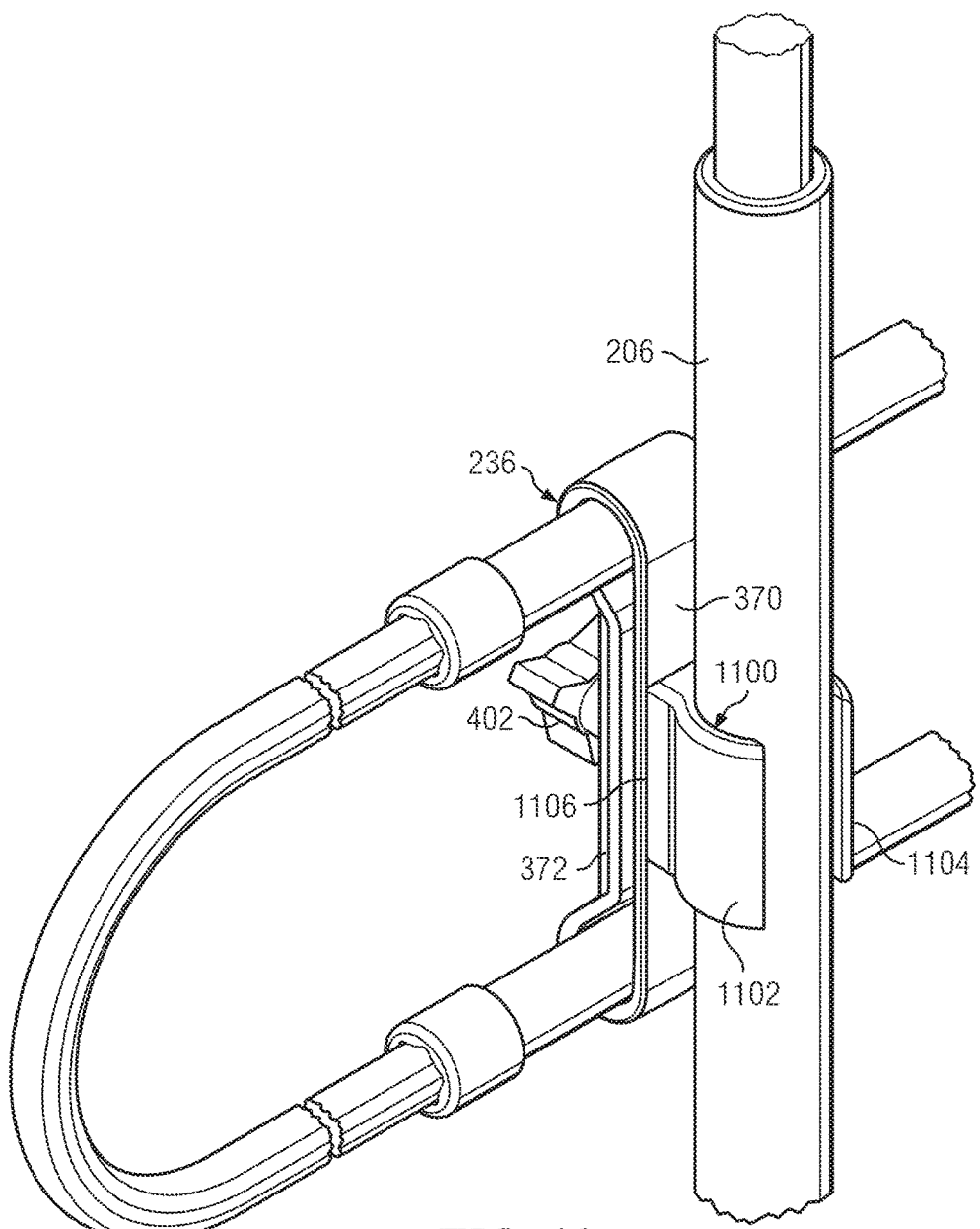
FIG. 13 is a perspective detail of a fence clamp affixed to a pole tube using the adapting collar.

To accomplish this, a pair of adapting collars 1100 is employed. As seen in FIG. 13, each adapting collar 1100 is split on its rearward side, leaving a right wing 1102 and a left wing 1104 that are formed as cylindrical sections. Wings 1102 and 1104 are joined at the front by a front plate 1106. As seen in FIG. 14A, the collar 1100 has a recess 1108 that is deep enough to receive carriage bolt head 394. A square hole 1110 is formed in the front plate 1106 to receive square section 396 of the bolt 392. A front surface 1112 of front plate 1106 has a rectangularly shaped periphery 1114 that provides a contact surface for the rear surface of rear fence clamp strap 370.

To use the adapting collars 1100, the carriage bolts 392 for two of the fence clamps are extracted from respective upright channels 348. Each carriage bolt 392 is instead inserted into the rear surface of a front plate 1106 of a collar 1100. As so inserted, the head 394 will fit within the recess 1108, and the square section 396 will fit within the square hole 1110. The threaded portion 398 of the shaft will protrude out of the front face of the front plate 1106. Then, the collar 1100 is snapped around a selected tube 206 at the desired vertical position. The collar 1100 preferably molded of a tough but resilient plastic that permits the spreading apart without permanent deformation of the curved wings 1102, 1104.

After the collars 1100 are installed on the pole tubes 206, the fence clamps 236 are screwed onto the collars 1100 using the knobs 402, and assembly is then complete.

Figures 15, 16, 17:
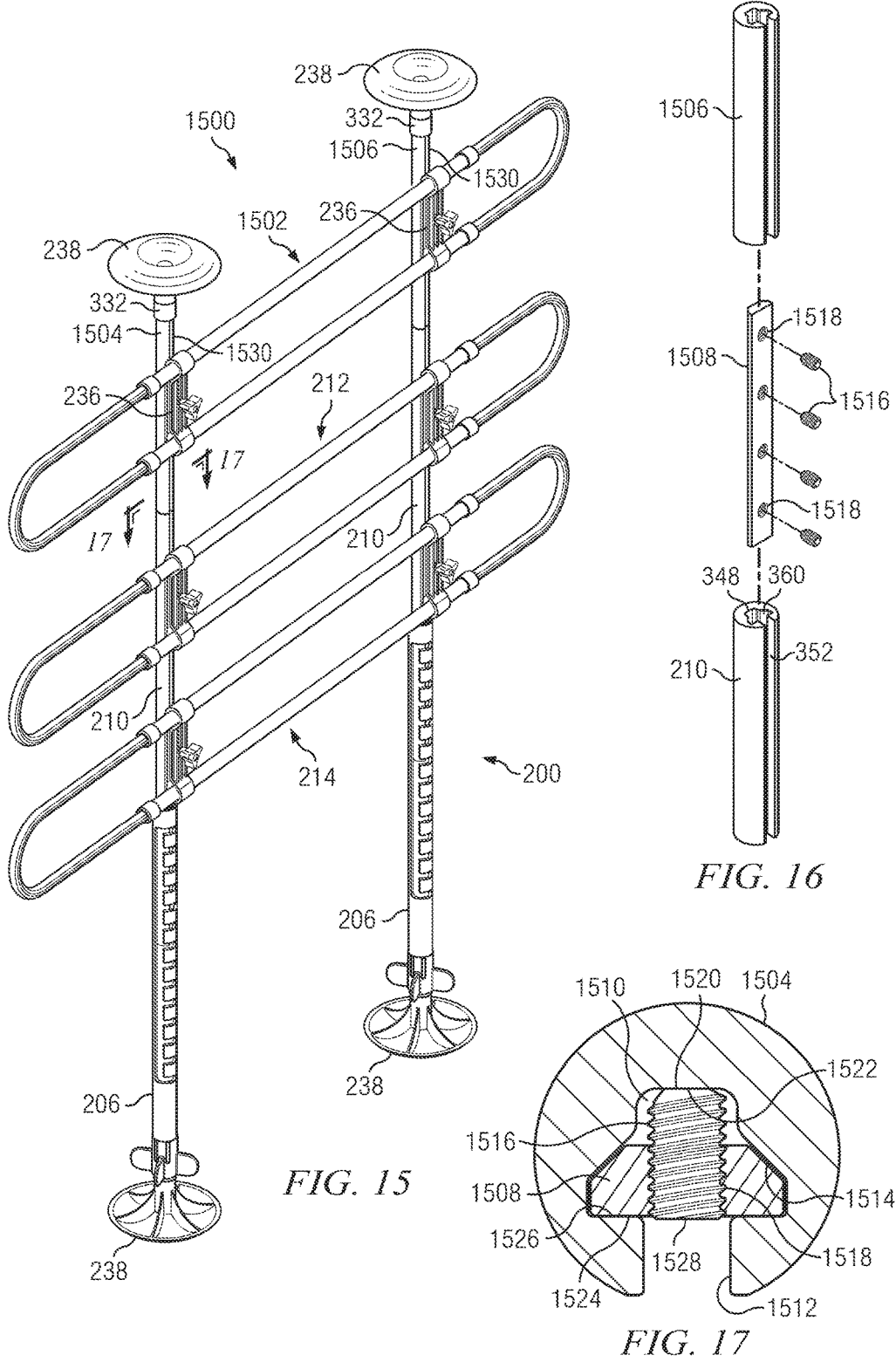
FIG. 15 is a top perspective view of the embodiment of the pet barrier shown in FIG. 2, but as extended using an extension kit.
FIG. 16 is an exploded perspective detail showing an elongate upright, an extension insert and an upright extension.
FIG. 17 is a transverse sectional view taken substantially along Line 17-17 of FIG. 15.

FIGS. 15-17 illustrate the pet barrier 200 as vertically extended using an extension kit 1500. The vertical extension is used to accommodate vehicles that have a very tall interior height between the vehicle headliner and the lower supporting surface (which can be the floor of a cargo area or a rear set of foot wells). The kit 1500 includes a third fence 1502 that is identical in all respects to fences 212 and 214. Fence 1502 may be attached to a pair of upright extensions 1504 and 1506 using a further pair of fence clamps 236. Extensions 1504, 1506 have cross-sections that are identical to the cross section of elongate uprights 210 and may be formed of aluminum extrusions.

Each extension 1504, 1506 is attached to a respective elongate upright 210 with the aid of a respective extension insert 1508. Taking extension 1504 as an example, and referring particularly to FIG. 17, extension 1504 has a channel 1510 with a throat 1512 of limited transverse width and a channel interior 1514 that has a transverse width that is wider than the width of throat 1512. A transverse width of insert 1508 is a little less than the greatest width of channel interior 1514 so that an upper section of insert 1508 may be slid into channel interior 1514. A cross-sectional shape of insert 1508 may be beveled and may conform to the shape of channel interior 1514, as shown. A lower section of insert 1508 is slid into channel interior 360 of channel 348 of elongate upright 210, which has a shape identical to the shape of channel interior 1514.

The insert 1508 is affixed to elongate upright 210 and to extension 1504 with the aid of at least two, and in the illustrated embodiment four, set screws 1516. Each set screw 1516 is threaded through a respective threaded bore 1518 in the extension insert 1508. The screw is turned until a cup point nose 1520 of the set screw 1516 applies pressure to an inner face 1522 of the extension channel 1510. This in turn causes a forward face 1524 of the insert 1508 to apply pressure to a rearward face 1526 of the channel 1510, clamping the insert 1508 to the upright extension 1504. While set screw 1516 could have a head that protrudes forwardly out of channel throat 1512, it is preferred that set screw 1516 have a female head 1528 that accepts a male tool such as an Allen wrench or a Torx screwdriver and that the head 1528 of the set screw 1516 be recessed inside of channel throat 1512. The method of attachment of the insert 1508 to elongate upright 210 is similar. The method of attaching extension 1506 to its respective upright 210 is the same as that described above for the attachment of extension 1504.

In modifying the barrier 200 for a tall interior, the end fittings 332 and upper elastomeric feet 238 are removed from the upper ends of the uprights 210 and are re-attached to the respective upper ends 1530 of the extensions 1504, 1506. The extended barrier is then ready for installation in the vehicle.

In summary, an improved pet barrier has poles terminated by elastomeric feet that will not mar vehicle headlines or flooring surfaces, but which provide improved stability and conformability to curved vehicle interiors. The pet barrier's poles have coarse and fine height adjustment mechanisms that make installation quicker. Fences of the pet barriers are installable onto the poles thereof with a single fastener that may be clamped in place with one hand.

While illustrated embodiments of the present invention have been described and illustrated in the appended drawings, the present invention is not limited thereto but only by the scope and spirit of the appended claims.

We claim:

1. A pet barrier for installation into a vehicle interior, the pet barrier comprising:
   first and second poles, each pole being elongate and arranged on a respective pole axis and extending from a first vehicle interior surface to a second vehicle interior surface, the first and second poles being parallel to each other, the poles being spaced apart from each other in a lateral direction orthogonal to the pole axes;
   at least one barrier fence, the fence being elongate in a lateral direction orthogonal to the pole axes and affixed to each of the first and second poles; and
   each pole having first and second pole ends, for each first pole end, a respective elastomeric support foot affixed to the first pole end, the support foot disposed on a first axis that is a respective one of the pole axes;
   the support foot having a body and a contact surface integrally molded with the body, the first axis aligned with a surface contact direction and with a pole end direction opposed to the surface contact direction, the contact surface of the support foot having a near end proximate the first axis and a far end remote from the first axis, the contact surface of the support foot being continuously convexly curved, as viewed from a point spaced from the contact surface in the surface contact direction, between the near end of the contact surface and the far end of the contact surface, an angle of the contact surface relative to the first axis and taken at the near end of the contact surface being less than 90 degrees, an angle of the contact surface relative to the first axis and taken at the far end of the contact surface being more than 90 degrees, a locus on the contact surface being disposed between the near end of the contact surface and the far end of the contact surface, an angle of the contact surface relative to the first axis and taken at the locus being 90 degrees.

2. The pet barrier of claim 1, wherein the contact surface is annular, a cavity of the body of the foot extending in the pole end direction from the near end of the contact surface and formed around the first axis.

3. The pet barrier of claim 2, wherein a floor of the cavity of the body is formed by a closed web that extends across the first axis.

4. The pet barrier of claim 1, wherein the contact surface of the support foot is formed by a contact sidewall of substantially uniform thickness, the contact sidewall having an opposed surface opposed to the contact surface and facing the pole end direction, the opposed surface having a near end proximate the first axis and a far end remote from the first axis, the opposed surface being continuously concavely curved as viewed from a point spaced from the opposed surface in the pole end direction;
   a cylindrical sidewall of the body extending in the pole end direction from the near end of the opposed surface of the support foot, the support foot further including a plurality of angularly spaced apart gussets each extending from the far end of the opposed surface of the contact sidewall to a respective point on the cylindrical sidewall of the support foot body, a margin of each gusset being displaced from the opposed surface of the contact surface in a pole end direction.

5. The pet barrier of claim 4, wherein the margin of each gusset is concavely curved when viewed from a point spaced from the opposed surface of the contact sidewall in the pole end direction.

6. The pet barrier of claim 1, wherein a support foot is affixed to each second end of the first and second poles.

7. The pet barrier of claim 1, wherein the contact surface of the support foot is formed by a contact sidewall of substantially uniform thickness, the contact sidewall having a near end proximate the first axis and a far end remote from the first axis, a cylindrical sidewall of the body extending in the pole end direction from the near end of the contact sidewall, the cylindrical sidewall having an open end in the pole end direction and terminating in a closed web in the surface contact direction, the cylindrical sidewall forming a cylindrical cavity, a raised cylindrical nipple formed on the web to be radially interiorly spaced from the cylindrical sidewall and to extend into the cylindrical cavity;
   each pole terminating in an end fitting with a hollow central bore, the cylindrical cavity of the body of the support foot adapted to receive the end fitting, the hollow central bore of the end fitting receiving the cylindrical nipple, the cylindrical nipple resisting separation of the foot from the pole due to bending of the foot relative to the pole.

8. A pet barrier for installation into a vehicle interior, the pet barrier comprising:
   first and second elongate poles, each pole disposed on a respective vertical axis and having an upper end and a lower end opposed to the upper end, the poles being horizontally spaced apart from each other;
   at least one fence, the fence being elongate in a horizontal direction, the fence being affixed to each of the first and second poles;
   each pole having an elongate tube with a central bore extending from an upper end of the tube to a lower end of the tube, an elongate upright having an outer surface that is slidably received into the upper end of the tube, the tube having a sidewall, an elongate axial slot formed through the tube sidewall to be parallel to the axis of the pole, a plurality of coarse adjustment slots formed through the sidewall of the tube to be axially spaced apart from each other, the axial slot communicating together each of the coarse adjustment slots, the coarse adjustment slots each angularly extending from the axial slot;
   a coarse adjustment pin of the elongate upright extending radially outwardly from the outer surface of the elongate upright, the pin adapted to be moved along the axial slot of the insert and then positioned in a selected one of the coarse adjustment slots to thereby effect a coarse adjustment of a height of the pole to a height of the vehicle interior;
   for each pole, a fine adjustment mechanism including a post with an upper end and a lower end, a threaded section of the post extending downwardly from the upper end of the post, the tube of the pole having a cylindrical outer surface and a circumferential groove formed on the outer surface to be spaced from the lower end of the tube, the upper end of the post slidably inserted into the lower end of the tube, a nut of the fine adjustment mechanism extending over the lower end of the tube and having an upper end and a lower end, a flange radially inwardly extending from the upper end of the nut to rotatably engage the groove on the outer surface of the tube, threads of the nut formed adjacent the lower end of the nut and threadably engaging the threaded section of the post, whereby turning the nut in the groove of the tube extends the post from the lower end of the tube or retracts the post into the lower end of the tube, thereby effecting a fine adjustment of the height of the pole to the height of the vehicle interior.

9. The pet barrier of claim 8, wherein the bore of the tube includes a noncircular section adjacent the lower end of the tube, the threaded section of the post being noncircular in cross section, the noncircular section of the bore of the tube preventing the rotation of the post about the tube axis as the post is extended from or retracted into the tube.

10. The pet barrier of claim 8, wherein the nut of the fine adjustment mechanism is a wingnut with an outer surface, a plurality of angularly spaced apart wings radially outwardly extending from the outer surface of the wingnut to permit the manual rotation of the nut with respect to the tube.

11. The pet barrier of claim 8, wherein the elongate upright has an axial channel, a throat of the channel opening onto the outer surface of the elongate upright, the throat of the channel communicating the outer surface of the elongate upright with a channel interior, a horizontal width of the throat of the channel being smaller than a horizontal width of the channel interior;
the coarse adjustment pin comprising a screw, a shaft of the screw extending radially inwardly through the throat of the channel into the channel interior, a flat nut disposed in the channel and threadably engaging the shaft of the screw to affix the screw to the elongate upright.

12. A pet barrier for installation into a vehicle interior, the pet barrier comprising:
first and second poles for extension between a vehicle floor and a vehicle headliner, each pole disposed on a respective vertical pole axis so as to be parallel to and horizontally spaced apart from the other pole;
each pole including a vertical member with a front surface;
a fence of the pet barrier including upper and lower elongate cross bars, the upper and lower cross bars disposed to be horizontal, in parallel to each other and vertically spaced from each other;
for each pole, a fence clamp for clamping the upper and lower cross bars to the pole, the fence clamp comprising an elongate rear strap disposed to be adjacent to the front surface of the vertical member and an elongate front strap spaced forward from the rear strap when the fence clamp is in an unclamped condition, at least the front strap being formed of a resilient material, the front and rear straps each having upper and lower ends, an upper crossbar gripping portion of the clamp connecting the upper end of the front strap to the upper end of the rear strap, a lower crossbar gripping portion of the clamp connecting the lower end of the front strap to the lower end of the rear strap, a fastener hole of the rear strap disposed in between the upper end of the rear strap and the lower end of the rear strap, a fastener hole of the front strap disposed in between the upper end of the front strap and the lower end of the front strap; and
a fastener for fastening the upper and lower cross bars to the vertical member, the fastener including a threaded shaft frontwardly extending from the front surface of the vertical member through the fastener hole of the rear strap and through the fastener hole of the front strap, a knob coupled to the threaded shaft, rotation of the knob in a predetermined direction causing the front strap to deflect toward the rear strap such that the clamp assumes a clamped condition, the fence clamp applies clamping pressure to the cross bars.

13. The pet barrier of claim 12, wherein the vertical member has an axially aligned channel with a channel interior and a throat communicating the channel interior to the front surface of the vertical member, a transverse width of the throat being smaller than a transverse width of the channel interior, the fastener being slidable along the channel when the fence clamp is in an unclamped condition, the fastener being affixed to the vertical member when the fence clamp is in a clamped condition.

14. The pet barrier of claim 13, wherein the threaded shaft is a threaded shaft of a bolt, a head of the bolt disposed in the channel interior, the knob being a thumb nut in threaded engagement with the threaded shaft.

15. A kit including the pet barrier of claim 14, wherein each of the first and second poles is a pole that includes a tube having an upper end, the vertical member of the pole received into the upper end of the tube, an adjustment mechanism adapted to extend the vertical member out of the upper end of the tube to any of a plurality of positions such that a height of the pole may be adjusted to a height of the vehicle interior, the tube having a cylindrical outer surface, the kit further including a bracket with a front plate and opposed curved sections adapted to snap around the cylindrical outer surface of the tube, the bracket permitting the fence to be affixed to the tube rather than to the vertical member, the bolt threaded through the front plate of the bracket rather than extending frontwardly from the channel in the vertical member, such that the fence may be affixed to the pole at a height that intersects the tube rather than be affixed to the pole that intersects the vertical member of the pole.

16. The pet barrier of claim 14, wherein the bolt is a carriage bolt having a square section of the shaft adjoining the head of the bolt and a threaded section of the shaft extending forwardly from the square section of the shaft, the square section of the shaft fitting into the throat of the channel such that the carriage bolt does not rotate relative to the vertical member.

17. The pet barrier of claim 12, wherein the front strap, the back strap and the upper and lower cross bar gripping members of the fence clamp are integrally formed of a resilient material.

18. The pet barrier of claim 12, wherein the upper cross bar gripping member wraps around a majority of the cross-sectional periphery of the upper cross bar of the fence, and the lower cross bar gripping member wraps around a majority of the cross-sectional periphery of the lower cross bar of the fence.

19. The pet barrier of claim 18, wherein the cross-sectional peripheries of the upper and lower cross bars are circular.

20. The pet barrier of claim 12, wherein the front strap of the fence clamp includes a main plate oriented transversely of the threaded shaft of the fastener, and at least one reinforcing rib extending frontwardly from the main plate to lend stiffness to the front strap.

21. The pet barrier of claim 20, wherein the front strap of the fence clamp includes a plurality of spaced-apart reinforcing ribs extending frontwardly from the main plate.

22. The pet barrier of claim 12, wherein the fence is one of a plurality of fences, each of the fences affixed to the first and second poles at locations that are vertically spaced apart from each other.

* * * * *